(12) United States Patent
Gemeinhardt et al.

(10) Patent No.: US 11,286,782 B2
(45) Date of Patent: Mar. 29, 2022

(54) MULTI-MATERIAL LEADING EDGE PROTECTOR

(71) Applicant: General Electric Company, Schenectady, NY (US)

(72) Inventors: Gregory Carl Gemeinhardt, Park Hills, KY (US); Douglas Duane Ward, Hamilton, OH (US); David William Crall, Loveland, OH (US); Nicholas Joseph Kray, Mason, OH (US)

(73) Assignee: General Electric Company, Schenectady, NY (US)

( * ) Notice: Subject to any disclaimer, the term of this patent is extended or adjusted under 35 U.S.C. 154(b) by 128 days.

(21) Appl. No.: 16/213,653

(22) Filed: Dec. 7, 2018

(65) Prior Publication Data

US 2020/0182062 A1 Jun. 11, 2020

(51) Int. Cl.
*F01D 5/14* (2006.01)
*F01D 5/28* (2006.01)
*B23P 15/04* (2006.01)
*B64C 11/20* (2006.01)
*B29D 99/00* (2010.01)

(52) U.S. Cl.
CPC .............. *F01D 5/141* (2013.01); *B23P 15/04* (2013.01); *B29D 99/0025* (2013.01); *B64C 11/205* (2013.01); *F01D 5/282* (2013.01); *F05D 2300/133* (2013.01); *F05D 2300/171* (2013.01)

(58) Field of Classification Search
CPC .......... F01D 5/141; F01D 5/282; F01D 5/147; F05D 2300/133; F05D 2300/171; F05D 2240/303; F05D 2240/307; F04D 29/324; F04D 29/388; B23P 15/04; B29D 99/0025; B64C 11/205
USPC .......................................................... 416/2
See application file for complete search history.

(56) References Cited

U.S. PATENT DOCUMENTS

| | | | |
|---|---|---|---|
| 3,564,689 A | 2/1971 | Hirtenlechner | |
| 4,010,530 A | 3/1977 | Delgrosso et al. | |
| 4,738,594 A * | 4/1988 | Sato ....................... | F04D 29/388 416/213 A |
| 6,655,921 B2 | 12/2003 | Kocian | |
| 7,156,622 B2 | 1/2007 | Schreiber | |
| 7,967,570 B2 | 6/2011 | Shi et al. | |
| 8,256,661 B2 * | 9/2012 | VanDyke ............. | B23K 20/021 228/193 |
| 9,011,087 B2 | 4/2015 | Mironets et al. | |
| 9,346,134 B2 | 5/2016 | Godon et al. | |
| 9,364,887 B2 | 6/2016 | Godon et al. | |
| 9,664,201 B2 | 5/2017 | Dudon et al. | |
| 9,828,860 B2 | 11/2017 | Schreiber | |
| 9,874,103 B2 | 1/2018 | Leconte et al. | |
| 9,963,971 B2 | 5/2018 | Franchet et al. | |
| 10,030,522 B2 * | 7/2018 | Benson ..................... | F02C 7/05 |

(Continued)

*Primary Examiner* — Christopher Verdier
*Assistant Examiner* — Eric A Lange
(74) *Attorney, Agent, or Firm* — Dority & Manning, P.A.

(57) ABSTRACT

An airfoil that includes an airfoil body having a root and a tip, and convex and concave sides that extend between a leading edge and a trailing edge. The airfoil also includes at least a first cladding element that is attached to the airfoil body. The first cladding element includes a first portion and a second portion. The second portion is configured to separate from the first portion when the first cladding element encounters a force of at least a predetermined amount.

19 Claims, 7 Drawing Sheets

(56) References Cited

U.S. PATENT DOCUMENTS

| | | | |
|---|---|---|---|
| 2012/0028055 A1* | 2/2012 | Schmidt | C09D 123/16 |
| | | | 428/450 |
| 2012/0100006 A1* | 4/2012 | Merriman | F04D 29/324 |
| | | | 416/243 |
| 2015/0104325 A1* | 4/2015 | Yagi | F04D 29/325 |
| | | | 416/224 |
| 2016/0177744 A1* | 6/2016 | Benson | F01D 5/147 |
| | | | 416/241 R |
| 2017/0197706 A1 | 7/2017 | Garcia Nieto et al. | |
| 2017/0268349 A1* | 9/2017 | Bryant, Jr. | F01D 5/147 |

\* cited by examiner

(MULTI-MATERIAL LEADING EDGE PROTECTOR)

MULTI-MATERIAL LEADING EDGE PROTECTOR

BACKGROUND OF THE INVENTION

This invention relates generally to airfoils and in particular to fan blades with multi-material reinforcement.

Fan blades and other structures used in turbine engine applications are susceptible to foreign object impact damage, for example during bird ingestion events ("bird strikes"). Blades made of composite materials such as carbon fiber reinforced epoxy are attractive due to their high overall specific strength, specific stiffness and light weight. However, carbon composites are particularly prone to brittle fracture and delamination during foreign object impacts due to their low ductility. Blade leading edges, trailing edges, and tips are particularly sensitive because of the generally lower thickness in these areas and the well-known susceptibility of laminated composites to free edge delamination.

It is known to provide impact damage protection for composite fan blades using edge protectors, i.e., cladding, bonded thereto. For example, fan blades having a composite body with cladding extending over the leading edge, the tip, and the trailing edge are known. Such cladding can be much stronger and more ductile than the composite materials that form the body of the blade, which are often brittle.

There are circumstances in which clad composite blades can fail. It is known to configure conventional blades to fail in a predictable manner such that the damaged blades do not cause further damage to the engine. However, one problem with conventional composite material blades that include cladding is that the tips of such blades do not separate from the bodies of the blades when exposed to a rub event because the cladding does not fail in the manner that the composite material of the blade fails.

BRIEF SUMMARY OF THE INVENTION

At least one of the above-noted problems is addressed by an airfoil that is clad with an edge protector that includes a tip portion and a body portion that meet at a boundary and the leading edge is configured such that it fails near the boundary when the leading edge experiences a predetermined force.

According to one aspect of the technology described herein, an airfoil that includes an airfoil body having a root and a tip, and convex and concave sides that extend between a leading edge and a trailing edge. The airfoil also includes at least a first cladding element that is attached to the airfoil body. The first cladding element includes a first portion and a second portion. The second portion is configured to separate from the first portion when the first cladding element encounters a force of at least a predetermined amount.

According to another aspect of the technology disclosed herein, a gas turbine engine apparatus that includes a turbomachinery core and a fan. The fan is coupled in a driven relationship with the turbomachinery core. The fan includes a plurality of blades positioned around a disk. Each blade includes an airfoil body made of the composite materials and having opposed pressure and suction sides. The blade extends in span between a root and a tip, and extends in chord between a leading edge and a trailing edge. At least a first cladding element is attached to the airfoil body. The first cladding element includes a first portion and a second portion and the second portion is configured to separate from the first portion when the first cladding element encounters a force of at least a predetermined amount.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
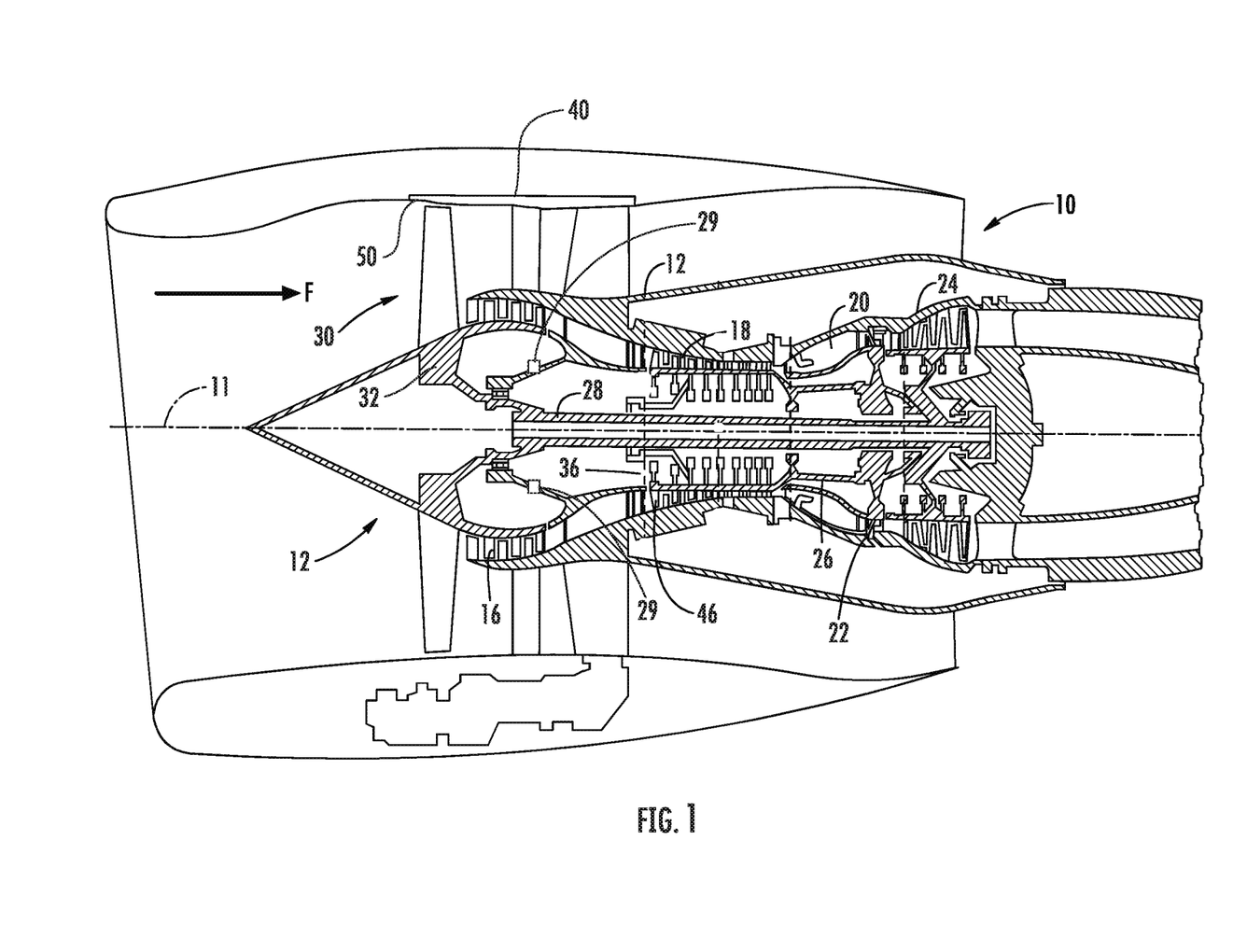
FIG. 1 is a schematic cross-sectional view of a gas turbine engine.

Referring to the drawings wherein identical reference numerals denote the same elements throughout the various views, FIG. 1 depicts an exemplary gas turbine engine 10 that includes a propulsion apparatus. While the illustrated example is a high-bypass turbofan engine, the principles of the present invention are also applicable to other types of engines, such as low-bypass turbofans, turbojets, turboprops, etc. The engine 10 has a longitudinal center line or axis 11. As used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The engine 10 has a fan 12, booster 16, compressor 18, combustor 20, high pressure turbine or "HPT" 22, and low-pressure turbine or "LPT" 24 arranged in serial flow relationship. In operation, pressurized air from the compressor 18 is mixed with fuel in the combustor 20 and ignited, thereby generating combustion gases. Some work is extracted from these gases by the high-pressure turbine 22 which drives the compressor 18 via an outer shaft 26. The combustion gases then flow into the low-pressure turbine 24, which drives the fan 12 and booster 16 via an inner shaft 28.

The fan 12 is one example of a propulsion apparatus. It will be understood that the principles described herein are applicable to other kinds of propulsion apparatus operable to produce propulsive thrust, such as ducted propellers or compressors. Instead of a gas turbine engine, the fan 12 or other propulsion apparatus could be driven by another type of prime mover such as: heat engines, motors (e.g. electric, hydraulic, or pneumatic), or combinations thereof (for example electric hybrid drivetrains). The propulsion apparatus may be driven directly by a prime mover, or through an intermediate geartrain.

A plurality of mechanical fuses 29 are positioned mechanically between the fan 12 and the shaft 28. The mechanical fuses 29 are configured to transfer rotational energy from the shaft 28 during normal operation. High radial forces may cause a mechanical fuse 29 to fail thus allowing the fan 12 to rotate about a new axis of rotation. The mechanical fuse 29 is referred to as a load reduction device, or LRD.

Figure 2:
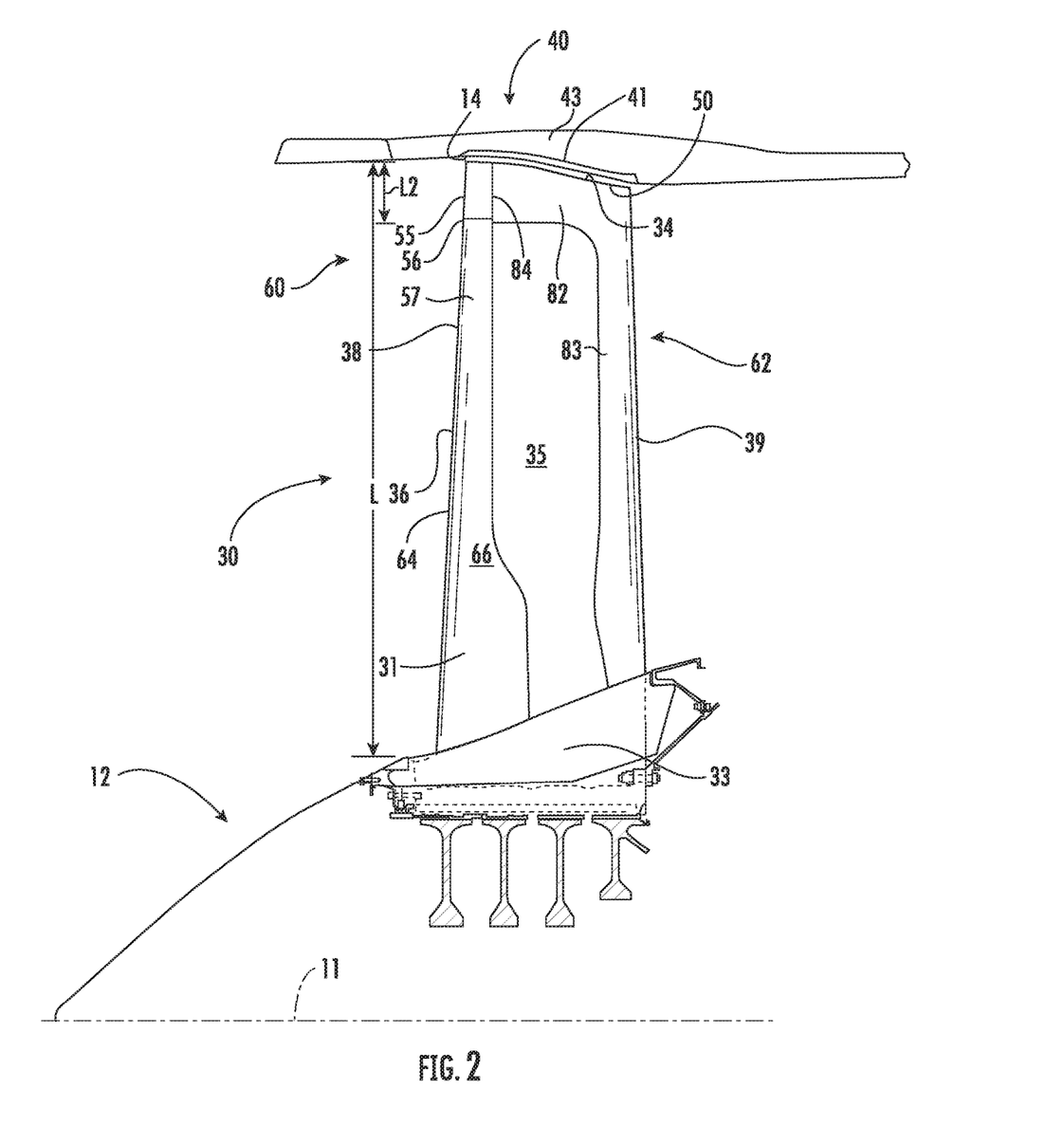
FIG. 2 is an enlarged view of a portion of the gas turbine engine of FIG. 1, showing a fan blade and a portion of a fan hub and shroud according to one embodiment of the disclosed technology.

Referring to FIG. 2, fan 12 includes a plurality of fan blades 30. The fan blades 30 are mounted to a fan disk 32 (shown in FIG. 1) that extends from a root 33 to a tip 34 and defines a length L. Additionally, each fan blade 30 includes a pressure side 35, a suction side 36, and reinforcement that includes a leading edge 38, and a trailing edge 39.

As shown in FIG. 2, the fan casing 40 includes an inner annular surface 50. The inner annular surface 50 has a generally circular cross-section and defines an inner diameter of the inner casing 40. The inner annular surface 50 is configured to channel the incoming air through the fan 12 (FIG. 1) so as to ensure that the fan 12 (FIG. 1) will compress the bulk of the air entering the engine 10. By way of example and not limitation, the fan casing 40 can be made of the following: a metal, a composite material, and a combination thereof.

The inner casing 40 includes a thin layer of shroud material 41 positioned adjacent to a blade tip path defined by the blades 30 of the fan 12. The shroud material 41 is supported by a containment structure 43. According to the illustrated embodiment, the containment structure 43 is generally solid and is not configured as a honeycomb structure or as other trench filler material such as that found in a conventional fan casing. Instead, the casing 40 consists essentially of a solid metal containment structure 43 and the shroud material 41.

A small radial gap 14 is present between the tips 34 of the fan blades 30 and the inner annular surface 50. It is this clearance, i.e., the radial gap 14, that is minimized in order to promote the efficiency of the engine 10.

The airfoil body 31 is made from a composite material, defined herein as a material including two or more distinct materials combined into one structure, for example a matrix having reinforcing fibers embedded therein. One example of a composite system suitable for use in aerospace applications includes an epoxy matrix with carbon fiber reinforcement.

In addition to the composite material, the fan blade 30 also incorporates at least one cladding element. In the specific example shown in FIG. 2, the cladding elements comprise a leading edge guard 60 and a tip cap 62.

The leading edge guard 60 is attached to the body 31 to define the leading edge 38. The leading edge guard 60 provides the fan blade 30 with additional impact resistance, erosion resistance, and improved resistance of the composite structure to delamination.

Figure 6:
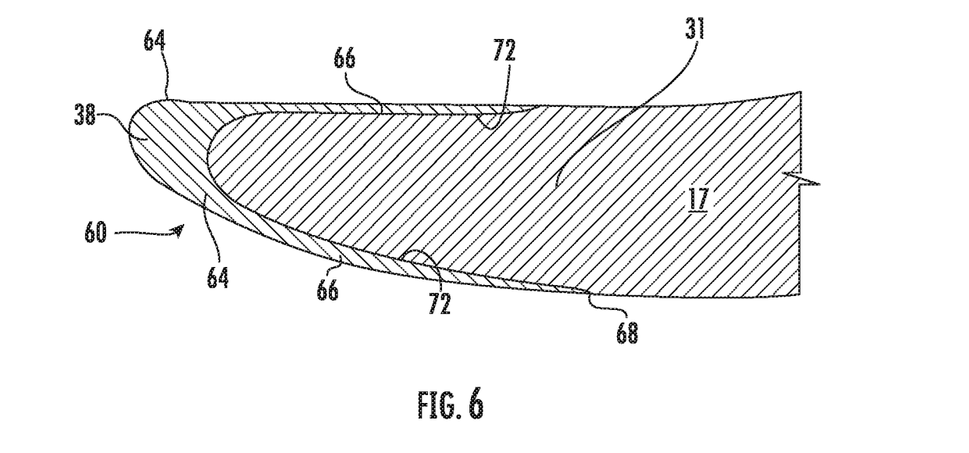
FIG. 6 is a sectional view of a leading edge of the blade with cladding.

As best seen in FIG. 6, the leading edge guard 60 includes a tip portion 55, i.e., a tip region, and a body portion 57, i.e., a body region, that meet at a boundary 56. The leading edge guard 60 further comprises a nose 64 with a pair of wings 66 extending aft therefrom. The wings 66 taper in thickness as they extend away from the nose 64. Exterior surfaces of the nose 64 and the wings 66 collectively define an exterior surface of the leading edge guard 60. The shape and dimensions of the exterior surfaces of the nose 64 and the wings 66 are selected to act as an aerodynamic extension of the airfoil body 31. Stated another way, the exterior shape of the blade 30 is defined in part by the airfoil body 31 and in part by the leading edge guard 60. The leading edge guard 60 may be attached to the airfoil body 31 with a known type of adhesive.

The tip portion 55 and the body portion 57 define interior surfaces of the nose 64 and wings 66 that collectively define an interior surface 72 of the leading edge guard 60. The shape and dimensions of the interior surface 72 are selected to closely fit the exterior of the airfoil body 31.

The body portion 57 of the leading edge guard 60 is made from a first material that may be a metal alloy of a composition providing desired strength and weight characteristics. Non-limiting examples of suitable alloys for construction of the leading edge guard 60 include titanium alloys, nickel alloys, and steel alloys. The body portion 57 of the leading edge guard may also be made of a nonmetallic material.

The tip portion 55 of the leading edge guard 60 is made from a second material that may be a metal alloy of a composition providing desired strength and weight characteristics. Non-limiting examples of suitable alloys for construction of the leading edge guard 60 include titanium alloys, nickel alloys and steel alloys. The leading edge guard 60 may also be made of a nonmetallic material.

The body portion 57 and the tip portion 55 on the leading edge 60 are configured to separate from each other during the event of a rub as will be discussed further below.

Figure 5:
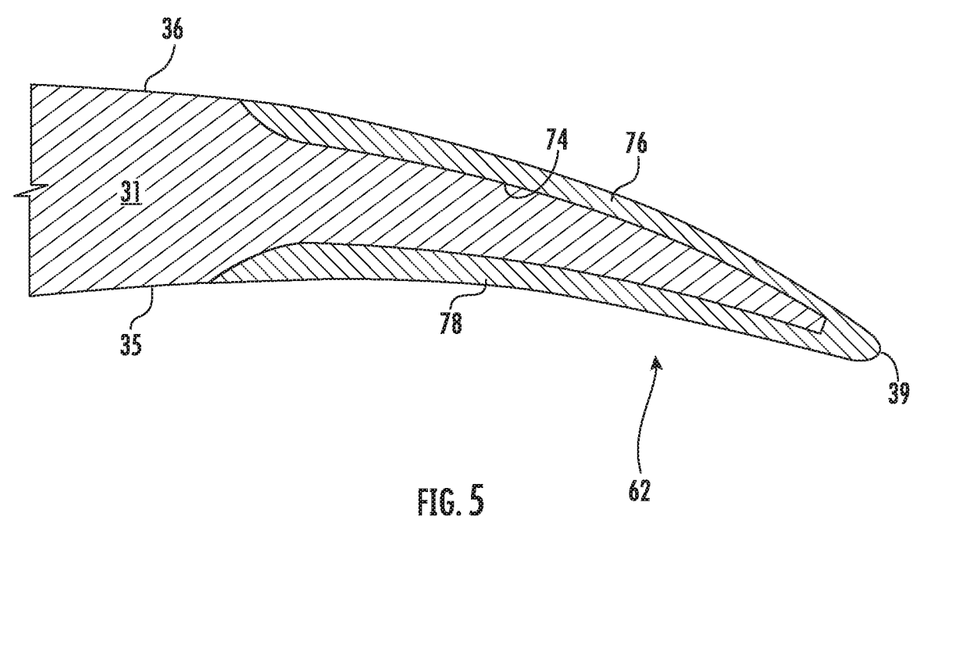
FIG. 5 is a sectional view of a trailing edge of a blade with cladding.

Referring now to FIGS. 2 and 5, the tip cap 62 overlies portions of the pressure and suction sides 35, 36 that are adjacent to the tip 34. The tip cap 62 provides additional impact protection, as well as stiffens the airfoil body 31 along the tip 34 and the trailing edge 39. The tip cap 62 includes a pair of side walls 76 and 78. The exterior surfaces of the side walls 76 and 78 collectively define an exterior surface of the tip cap 62. The shape and dimensions of the exterior surface are selected to act as an aerodynamic extension of the airfoil body 31. Stated another way, the exterior shape of the blade 30 is defined in part by the airfoil body 31 and in part by the tip cap 62. The tip cap 62 may be attached to the airfoil body 31 with a known type of adhesive.

Interior surfaces of the side walls 76 and 78 collectively define an interior surface 74 of the tip cap 62. The shape and dimensions of the interior surface 74 are selected to closely fit the exterior of the airfoil body 31.

Continuing to refer to FIG. 2, the tip cap 62 includes a tip portion 82 and a trailing edge portion 83. The two portions 82 and 83 roughly define an L-shape. An upper forward edge 84 of the tip cap 62 abuts the leading edge guard 60.

The tip cap 62 may be made from a metal alloy of a composition providing desired strength and weight characteristics. Non-limiting examples of suitable alloys for construction of the tip cap 62 include titanium alloys and nickel alloys and steel alloys. The tip cap 62 may also be formed of a nonmetallic material such as a ceramic material.

As shown in FIG. 2, the tip portion 55 has a length L2 and preferably begins at least 85% of the total length L of the blade 30 away from the root 33. Stated another way, according to the illustrated embodiment the length L2 of the tip portion 55 is less than 15% of the length L of the blade 30. The boundary 56 can be positioned closer to the blade tip 34 such that it is further away from the root 33 than 85% of the total length L of the blade 30. Optionally the tip portion 55 begins about 90% of the total length L of the blade 30 away from the root 33. The tip portion 55 continues from the boundary 56 to the blade tip 34.

As indicated above, the tip portion 55 is configured to separate from the tip body 57 at the boundary 56. In this regard, the boundary 56 is configured to fail during an event such as a "rub" in which the tip portion 55 contacts the shroud material 41. A rub could be caused, for example, by a blade 30 being damaged or released by a significant foreign object impact, or by a fan rotor decoupler to "fuse", causing the fan blade 30 to be displaced outboard of its nominal position (e.g., for the fan rotor to orbit or whirl). In this regard, the boundary 56 is configured such that the tip 34 and associated region of the body 31 of the blade 30 can quickly separate from the remaining portion of the body 31 of the blade 30.

Referring now to FIG. 2, the boundary 56 is defined in the illustrated embodiment by the abutting edges of tip portion 55 and the body portion 57. Wherein, as indicated above, the body portion 57 is formed of a first material and the tip portion 55 is formed of a second material. According to the illustrated embodiment, the second material is different than the first material. The second material may be weaker than the first material. The term "weaker" may refer to the second material having a lesser material property than the first material, such as yield-to-failure or ultimate strength.

Figure 3:
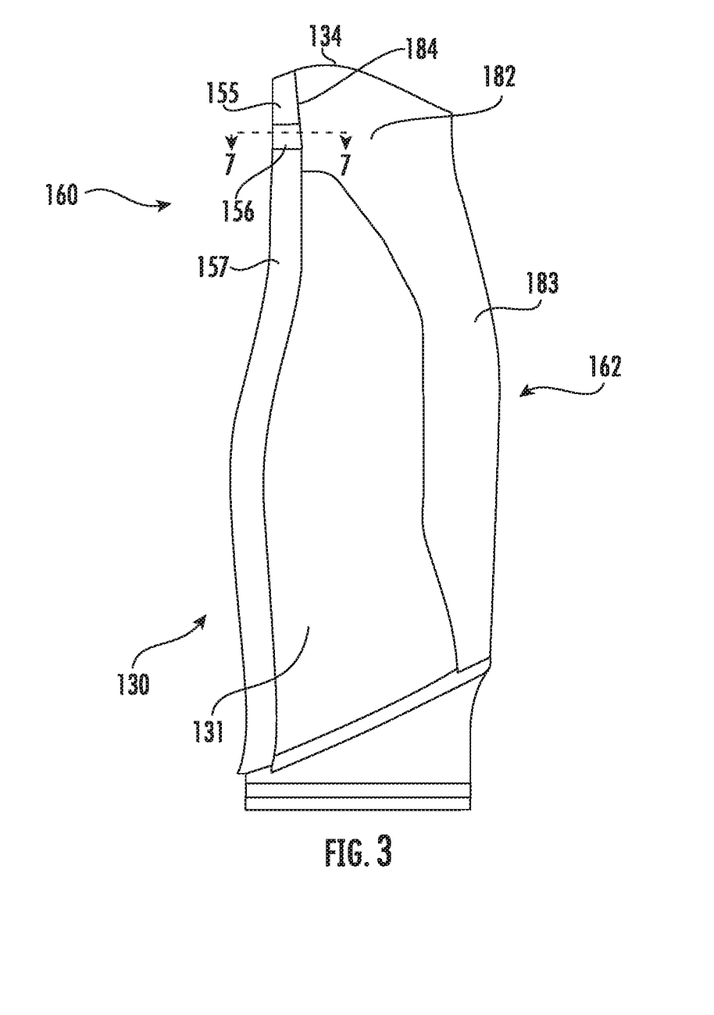
FIG. 3 is a view of a fan blade according to another embodiment of the disclosed technology.

Referring now to FIG. 3, there is provided an alternative embodiment of the disclosed technology. Elements of the alternative embodiment are referenced by numbers in the 100 series. In this regard, similar elements with similar numbers in the 100 series can be understood from the description of similar elements having similar reference numbers in the 0 series described above. There is provided a blade 130. The blade 130 includes a body 131, a leading edge guard 160 and a tip cap 162. The tip cap 162 includes a tip cap edge 184 and a tip portion 182 and a tip body portion 183. The leading edge guard 160 includes a tip region 155 and a body region 157. The tip region 155 and the body region 157 are separated by a boundary 156.

The boundary 156 can be formed of third material. The third material can be different than the first material and the second material described above with relation to the body region 157 and the tip region 155 respectively. The boundary 156 is configured to fail before the body region 157 such that the tip region 155 separates from the body region 157 of the leading edge 160 in the event of a rub or strike event. In this regard, the third material that comprises the boundary 156 can be chosen such that it is different than the first material and the second material and weaker. As a result, the boundary 156 would fail prior to the body region 157 of the leading edge 160. The term "weaker" may refer to the third material having a lesser material property, such as yield-to-failure or ultimate strength.

Figure 7:
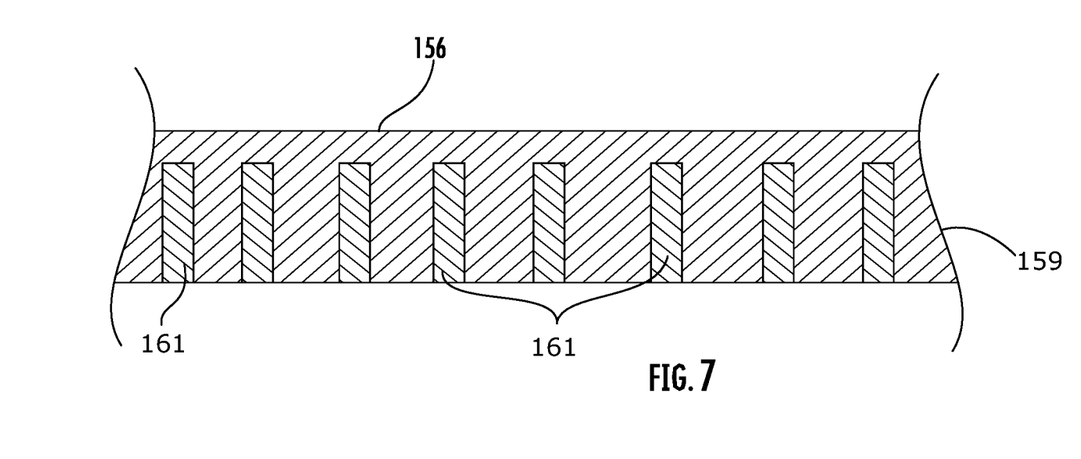
FIG. 7 shows a cross-section of an alternative embodiment of the boundary of the leading edge shown in FIG. 3 and taken along line 7-7.

According to some embodiments, the boundary 156 can be mechanically configured such that it fails prior to the body region 157 allowing the tip 134 to separate from the remainder of body 131 of the blade 130. The first material, the second material, and the third material that make up the body region 157, the tip region 155 and the boundary 156 respectively can be the same or different in embodiments where the boundary 156 is mechanically configured to fail at a predetermined force. For example, the predetermined force may be Referring now to FIG. 7, a section of the boundary 156 can be seen. The section is taken along the line 7-7 shown in FIG. 3. The boundary 156 includes a first portion 159. The first portion 159 has a series of blind holes 161 defined from a first side therein. The blind holes 161 can be filled with a fourth material. The fourth material is chosen such that the boundary 156 fails in the predetermined manner described above.

Figure 8:
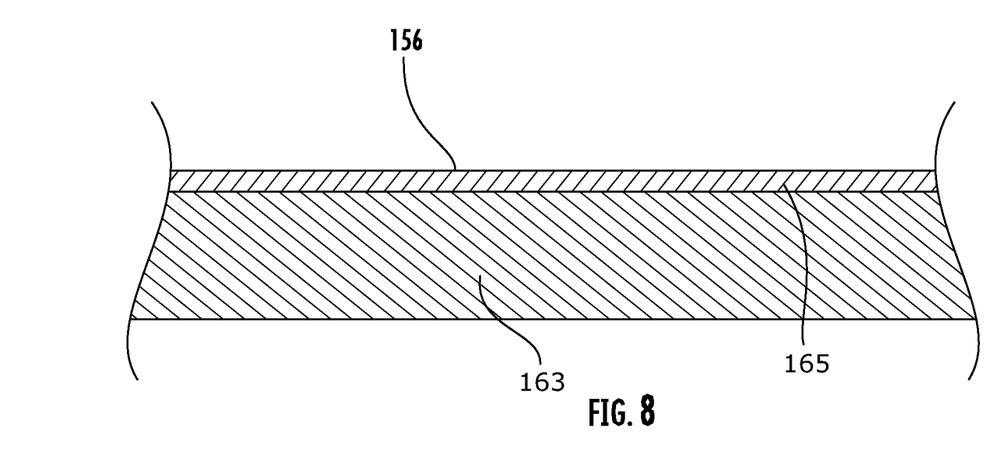
FIG. 8 shows a cross-section of another alternative embodiment of the boundary of the leading edge shown in FIG. 3 and taken along line 7-7.

Referring now to FIG. 8, according to another embodiment the boundary 156 can include a first layer 163 and the second layer 165. Again, the material of the first layer 163 is a fourth material chosen such that the boundary layer 156 fails in a predetermined manner described above.

Figure 9:
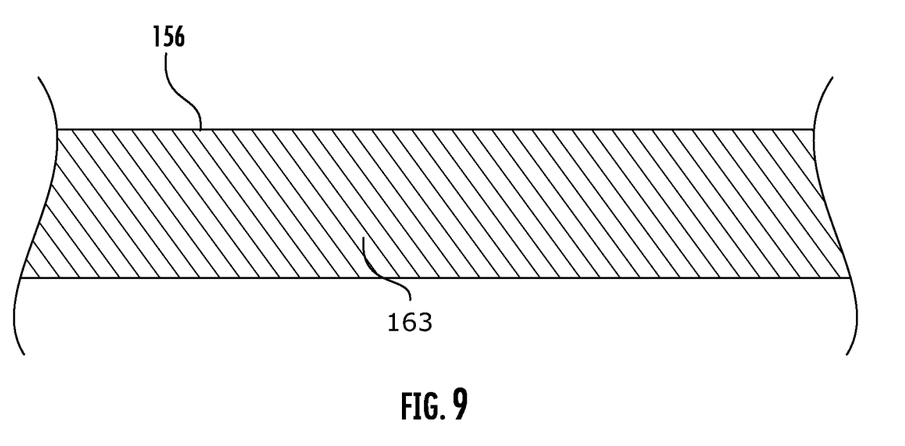
FIG. 9 shows a cross-section of yet another alternative embodiment of the boundary of the leading edge shown in FIG. 3 and taken along line 7-7.

Referring now to FIG. 9, according to another variation, the boundary 156 is comprised of only the layer 163 which as indicated above is made of a fourth material. The boundary 156 can also be generally thinner than the tip region 155 and the body region 157.

Figure 4:
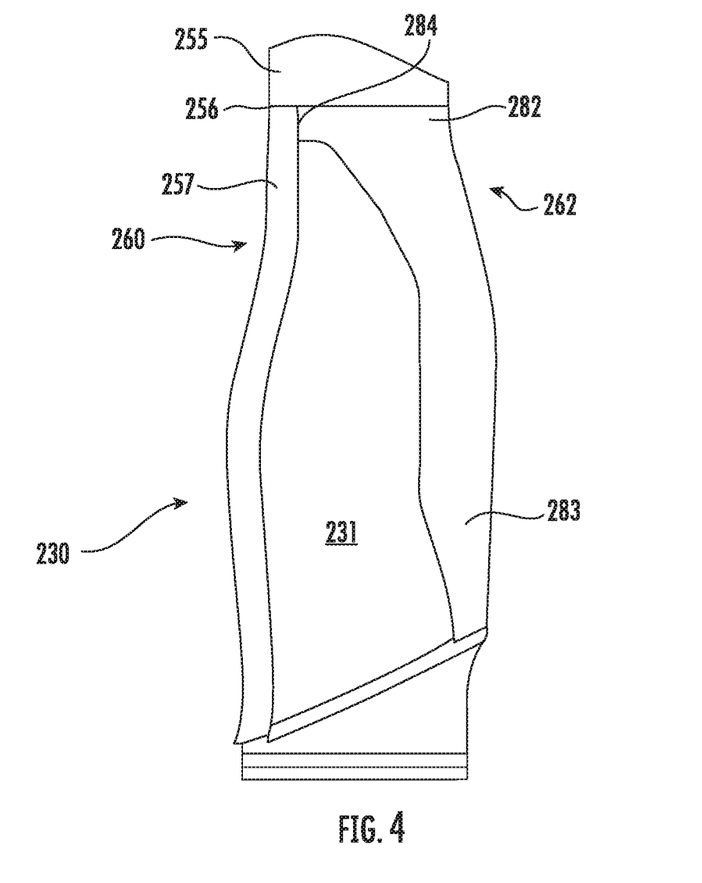
FIG. 4 is a view of a fan blade according to yet another embodiment of the disclosed technology.

Referring to FIG. 4, there is shown yet another alternative embodiment of the disclosed technology. Elements of the alternative embodiment are referenced by numbers in the 200 series. In this regard, similar elements with similar numbers in the 200 series can be understood from the description of similar elements having similar reference numbers in the 0 series described above. There is provided a blade 230. The blade 230 includes a body 231, a leading edge guard 260 and a tip cap 262. The tip cap 262 includes a tip cap edge 284 and a tip portion 282 and a tip body portion 283. The leading edge guard 260 includes a tip portion 255 and a body portion 257. The tip portion 255 extends across the blade 230 such that a boundary 256 separates the tip portion 255 from the body portion 257 and tip cap 262.

The fan blade 30 described above incorporates the beneficial properties of a composite blade having a metal leading edge and a frangible tip. The metal leading edge is configured to provide strength and resistance to impacts and to fail in a predetermined manner when the blade tip experiences a predetermined amount of rub force. One of ordinary skill in the art would be able to compute the forces generated during a rub event.

The foregoing has described a composite blade with protective cladding that is configured to fail in a predetermined manner. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. An airfoil, comprising:
an airfoil body having a root and a tip, and convex and concave sides extending between a leading edge and a trailing edge;
a first cladding element attached to the airfoil body, wherein the first cladding element is a leading edge guard attached to the leading edge of the airfoil body, the leading edge guard comprising a body portion and a tip portion, each of the body portion and the tip portion defining a nose with spaced-apart first and second wings extending from the nose, the nose and the spaced-apart first and second wings of the body portion being comprised of a first material, and the nose and spaced-apart first and second wings of the tip portion being comprised of a second material different from the first material, wherein the second material is weaker than the first material; and
the tip portion being configured to separate from the body portion when the first cladding element encounters a force of at least a predetermined amount.

2. The airfoil of claim 1 wherein the airfoil body comprises a composite material including a matrix having reinforcing fibers embedded therein.

3. The airfoil of claim 2 wherein the airfoil body comprises a polymeric matrix composite, including carbon reinforcing fibers.

4. The airfoil of claim 1 wherein the airfoil body includes a second cladding element.

5. The airfoil of claim 4 wherein the second cladding element is a tip cap.

6. The airfoil of claim 5 wherein the tip portion of the first cladding element extends across the tip of the airfoil body from the leading edge to the trailing edge, and wherein a boundary is defined between the tip portion and the body portion of the first cladding element and between the tip portion of the first cladding element and the second cladding element, and the first cladding element is configured to fail near the boundary when the first cladding element encounters a predetermined force.

7. The airfoil of claim 1 wherein the second material is a metal alloy of a composition or a nonmetallic material.

8. An airfoil, comprising:
an airfoil body having a root and a tip, and convex and concave sides extending between a leading edge and a trailing edge;
a first cladding element attached to the airfoil body, wherein the first cladding element is a leading edge guard attached to the leading edge of the airfoil body, the leading edge guard comprising a body portion and a tip portion, each of the body portion and the tip portion defining a nose with spaced-apart first and second wings extending from the nose, the nose and the spaced-apart first and second wings of the body portion being comprised of a first material, and the nose and spaced-apart first and second wings of the tip portion being comprised of a second material different from the first material; and
the tip portion being configured to separate from the body portion when the first cladding element encounters a force of a predetermined amount;
wherein the tip portion of the first cladding element and the body portion of the first cladding element define a boundary therebetween, and the first cladding element is configured to fail near the boundary when the first cladding element encounters a predetermined force;
wherein the boundary includes structure configured such that the boundary is weaker than both of the tip portion of the first cladding element and the body portion of the first cladding element such that the boundary fails when the first cladding element encounters the predetermined force and the tip portion of the first cladding element separates from the body portion of the first cladding element;
wherein the boundary comprises a third material; and
wherein the first material and the second material have similar strength characteristics.

9. The airfoil of claim 8 wherein the third material is weaker than the first material.

10. The airfoil of claim 9 wherein the third material is weaker than the second material.

11. The airfoil of claim 8 wherein the boundary includes a plurality of blind holes.

12. The airfoil of claim 11 wherein the boundary comprises a fourth material filling the plurality of blind holes.

13. The airfoil of claim 12 wherein the first material and the second material are a metal alloy of a composition or a nonmetallic material.

14. The airfoil of claim 13 wherein the first material, the second material, and the third material have similar characteristics.

15. The airfoil of claim 12 wherein the fourth material is different than the third material.

16. The airfoil of claim 15 wherein the boundary includes a first layer comprised of the third material and a second layer comprised of the fourth material.

17. The airfoil of claim 13 wherein the first material is a titanium alloy, a nickel alloy, or a steel alloy.

18. A gas turbine engine apparatus, comprising:
a turbomachinery core;
a fan coupled in driven relationship with the turbomachinery core, the fan including:
a plurality of blades positioned around a disk, each blade including:
an airfoil body comprising composite materials and having opposed pressure and suction sides, and extending in span between a root and a tip, and extending in chord between a leading edge and a trailing edge;
a first cladding element attached to the airfoil body, wherein the first cladding element is a leading edge guard attached to the leading edge of the airfoil body, the leading edge guard comprising a body portion and a tip portion, each of the body portion and the tip portion defining a nose with spaced-apart first and second wings extending from the nose, the nose and spaced-apart first and second wings of the body portion being comprised of a first material and the nose and spaced-apart first and second wings of the tip portion being comprised of a second material different from the first material, wherein the second material is weaker than the first material; and
the tip portion being configured to separate from the body portion when the first cladding element encounters a force of at least a predetermined amount.

19. The gas turbine engine apparatus according to claim 18 wherein the tip portion and the body portion meet at a boundary and the boundary is configured to fail before the tip portion and the body portion when the first cladding element is exposed to a predetermined force.

* * * * *